(12) United States Patent
Takuma

(10) Patent No.: US 8,115,875 B2
(45) Date of Patent: Feb. 14, 2012

(54) IMAGE DISPLAY DEVICE AND METHOD OF CONTROLLING THE SAME

(75) Inventor: Shinsuke Takuma, Tokyo (JP)

(73) Assignee: Sony Corporation (JP)

( * ) Notice: Subject to any disclaimer, the term of this patent is extended or adjusted under 35 U.S.C. 154(b) by 1307 days.

(21) Appl. No.: 11/804,220

(22) Filed: May 17, 2007

(65) Prior Publication Data

US 2007/0287495 A1 Dec. 13, 2007

(30) Foreign Application Priority Data

May 19, 2006 (JP) ................ P2006-140745

(51) Int. Cl.
*H04N 5/63* (2006.01)
*H04N 5/50* (2006.01)
(52) U.S. Cl. ........ 348/730; 348/733; 348/731; 348/739; 348/705; 348/706; 455/572
(58) Field of Classification Search .................. 348/730, 348/731, 732, 733, 739, 705, 706, 602; 455/572, 455/574; 372/38.04, 29.021; 334/47, 52, 334/11
See application file for complete search history.

(56) References Cited

U.S. PATENT DOCUMENTS

| | | | | |
|---|---|---|---|---|
| 5,616,988 A * | 4/1997 | Kim | .................................. | 315/1 |
| 5,726,871 A * | 3/1998 | Choi | ................................. | 363/89 |
| 5,808,693 A * | 9/1998 | Yamashita et al. | ............. | 348/554 |
| 7,826,874 B2 * | 11/2010 | Fyke | ............................... | 455/574 |
| 2007/0268403 A1* | 11/2007 | Oda et al. | ....................... | 348/460 |

FOREIGN PATENT DOCUMENTS

| | | |
|---|---|---|
| JP | 57-181281 A | 11/1982 |
| JP | 6-078246 A | 3/1994 |
| JP | 7-134628 A | 5/1995 |
| JP | 11-338575 A | 12/1999 |
| JP | 2005-191815 A | 7/2005 |

* cited by examiner

*Primary Examiner* — Jefferey Harold
*Assistant Examiner* — Jean W Desir
(74) *Attorney, Agent, or Firm* — Lerner, David, Littenberg, Krumholz & Mentlik, LLP

(57) ABSTRACT

An image display device may have a display portion, a signal-processing portion, a power supply portion that supplies power to the display portion and the signal-processing portion, a user interface portion, and a control portion that controls the display portion, the signal-processing portion, and the power supply portion. An operation mode may include a waiting mode in which power supply to the display portion and the signal-processing portion stops, an image-display-waiting mode in which power is supplied to the signal-processing portion but power supply to the display portion stops, and an image display mode in which power is supplied to the display portion and the signal-processing portion. The control portion may switch the operation mode, based on the operation signal, from the waiting mode or the image-display-waiting mode to the image display mode or from the image display mode to the image-display-waiting mode.

4 Claims, 3 Drawing Sheets

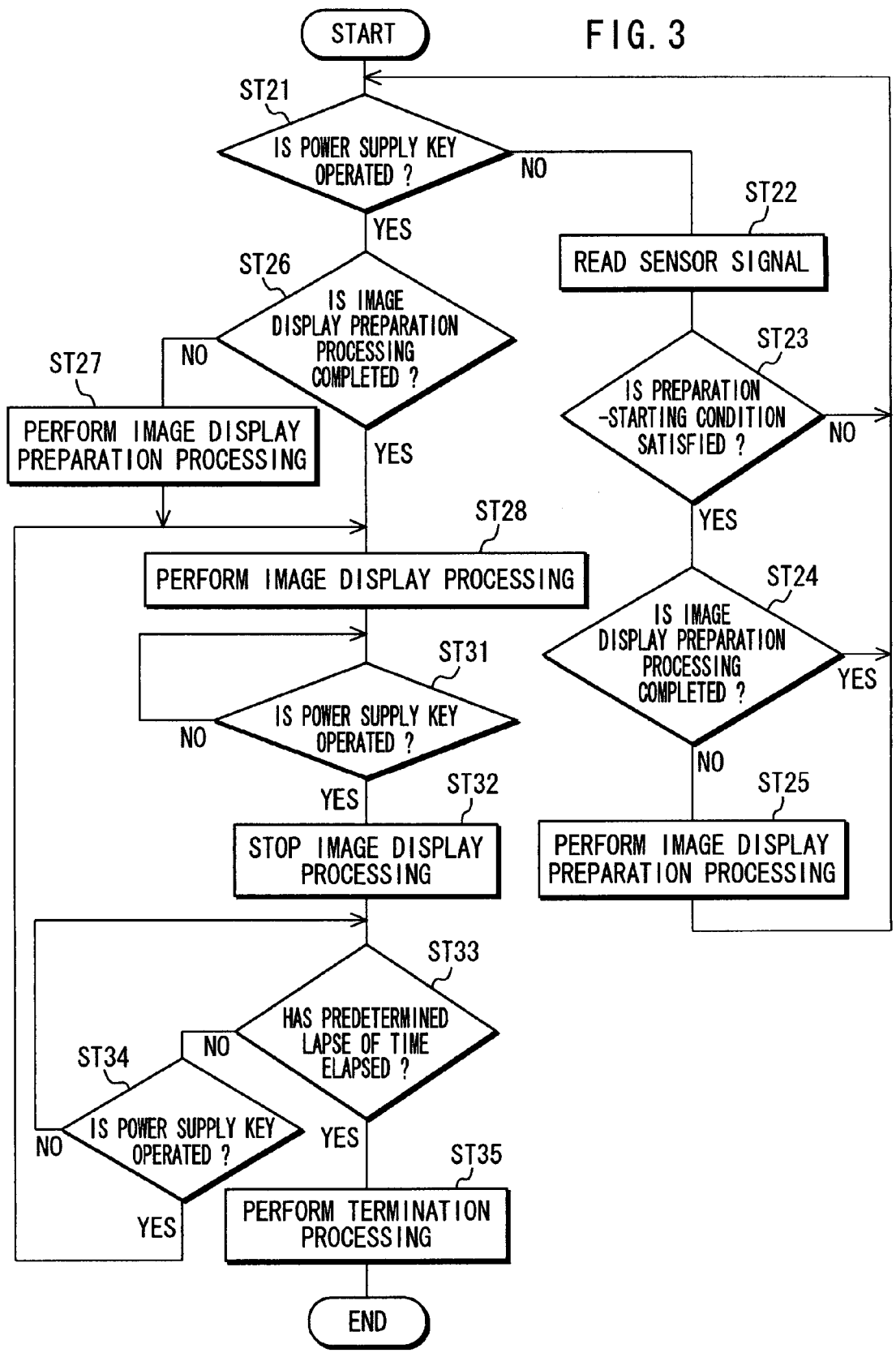

IMAGE DISPLAY DEVICE AND METHOD OF CONTROLLING THE SAME

CROSS-REFERENCE TO RELATED APPLICATIONS

This application claims priority from Japanese Patent Application No. JP 2006-140745 filed in the Japanese Patent Office on May 19, 2006, the entire content of which is incorporated herein by reference.

BACKGROUND OF THE INVENTION

1. Field of the Invention

The present invention relates to an image display device such as a TV receiving set and a method of controlling the same.

2. Description of Related Art

The image display device, for example, a TV receiving set, uses a real-time Operating System (OS) so that it can efficiently process data containing a sequence of image and audio. The image display device further uses a variety of hardware pieces and so stores device drivers etc. to drive the hardware pieces. Moreover, in digital broadcasting etc., it is provided with a TV program table referred to as an electronic program guide (EPG) and so storing the TV program table enables search of a program and confirmation of the program contents as well as reservation of video-recording of the program to be facilitated.

Further, the image display device has, as its operation mode, a waiting mode in which it accepts only a user operation after having finished reception signal processing or image display processing so that power dissipation may be reduced and an image display mode in which it performs the reception signal processing or the image display processing to display an image of a program selected by a user. If the operation mode is switched from the waiting mode to the image display mode to start viewing of a broadcast program etc., the real-time OS, various kinds of the device drivers, information on the TV program table and the like are read in order to carry out the reception signal processing, the image display processing, etc. Therefore, a certain lapse of time may be elapsed to a point of time when an image is displayed if the operation mode is switched from the waiting mode to the image display mode. Japanese Patent Application Publication No. 2005-191815 discloses a TV receiving set in which a predicted power-application time is calculated from an operation history so that power may be applied on a digital broadcast reception module at the predicted time, thereby enabling an image to be rapidly displayed.

SUMMARY OF THE INVENTION

In an image display device, however, if viewing is finished and once the operation mode is switched from the image display mode to the waiting mode, necessary information may be stored in a memory to subsequently stop power supply to a processing portion that performs reception signal processing, image display processing, etc. Therefore, once the operation mode is switched to the waiting mode, the software, the information and the like are read for each time it is switched from the waiting mode to the image display mode. Therefore, for example, even if the operation mode is switched to the image display mode immediately after it is switched to the waiting mode, an image is not immediately displayed, thereby preventing a good response from being obtained.

It may be desirable to provide an image display device and a method of controlling the same that can obtain a good response upon switchover of operation mode.

According to an embodiment of the present invention, there is provided an image display device which may contain a display portion that displays an image, a signal-processing portion that generates a display drive signal to drive the display portion, a power supply portion that supplies power to the display portion and the signal-processing portion, a user interface portion that generates an operation signal in response to a user operation, and a control portion that controls operations of the display portion, the signal-processing portion, and the power supply portion based on the operation signal. The image display device may operate based on an operation mode. The operation mode may include a waiting mode in which power supply to the display portion and the signal-processing portion stops to de-actuate the display portion and the signal-processing portion, an image-display-waiting mode in which power is supplied to the signal-processing portion to actuate the signal-processing portion but power supply to the display portion stops to de-actuate the display portion, and an image display mode in which power is supplied to the display portion and the signal-processing portion to actuate the display portion and the signal processing portion. The control portion may switch the operation mode, based on the operation signal, from the waiting mode or the image-display-waiting mode to the image display mode or from the image display mode to the image-display-waiting mode.

According to another embodiment of the present invention, there is provided a method of controlling an image display. The method may contain providing an operation mode as a waiting mode in which power supply to a display portion that displays an image and a signal-processing portion that generates a display drive signal to drive the display portion stops to de-actuate the display portion and the signal-processing portion, an image-display-waiting mode in which power is supplied to the signal-processing portion to actuate the signal-processing portion but power supply to the display portion stops to de-actuate the display portion, and an image display mode in which power is supplied to the display portion and the signal-processing portion to actuate the display portion and the signal processing portion. The method may also contain switching the operation mode from the waiting mode or the image-display-waiting mode to the image display mode or from the image display mode to the image-display-waiting mode on the basis of an operation signal in response to a user operation.

In the embodiments of present invention, the waiting mode may refer to a so-called standby mode, which is an operation mode in which power supply stops to a display portion that displays an image and a signal-processing portion constituted of, for example, a tuner unit, a decoder unit, etc. to drive the display portion, thereby de-actuating the display portion and the signal-processing portion to reduce dissipation power. The image display mode may refer to as a so-called ordinary mode, which is an operation mode in which power is supplied to the display portion and the signal-processing portion to actuate the display portion and the signal-processing portion, thereby displaying an image. Further, the image-display-waiting mode may be provided, in which the signal-processing portion is actuated to hold a state in which the software and various kinds of pieces of information are read but the display portion is de-actuated to avoid displaying an image. With this, based on the operation signal in response to the user operation, the operation mode may be switched from the waiting mode or the image-display-waiting mode to the image display mode or from the image display mode to the image-display-waiting mode. Further, as a sensor to detect a change in an ambient environment, for example, an illuminance sensor or a person detection sensor may be used to switch the operation mode from the waiting mode to the image-display-waiting mode based on a sensor signal from the sensor. In addition, when a predetermined lapse of time has elapsed since the operation mode has been changed to the image-display-waiting mode, the operation mode may be switched from the image-display-waiting mode to the waiting mode.

According to the embodiments of the invention, even if viewing starts immediately after former viewing is finished, the operation mode may be switched to the image-display-waiting mode in which the signal-processing portion that generates the display drive signal to drive the display portion is actuated, so that an image can be immediately displayed without reading any software and information, thereby obtaining a good response. This enables a period of waiting time to the image display to be shortened, thereby improving convenience.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 3 is a flowchart for showing other operations of the image display device.

DETAILED DESCRIPTION

Figure 1:
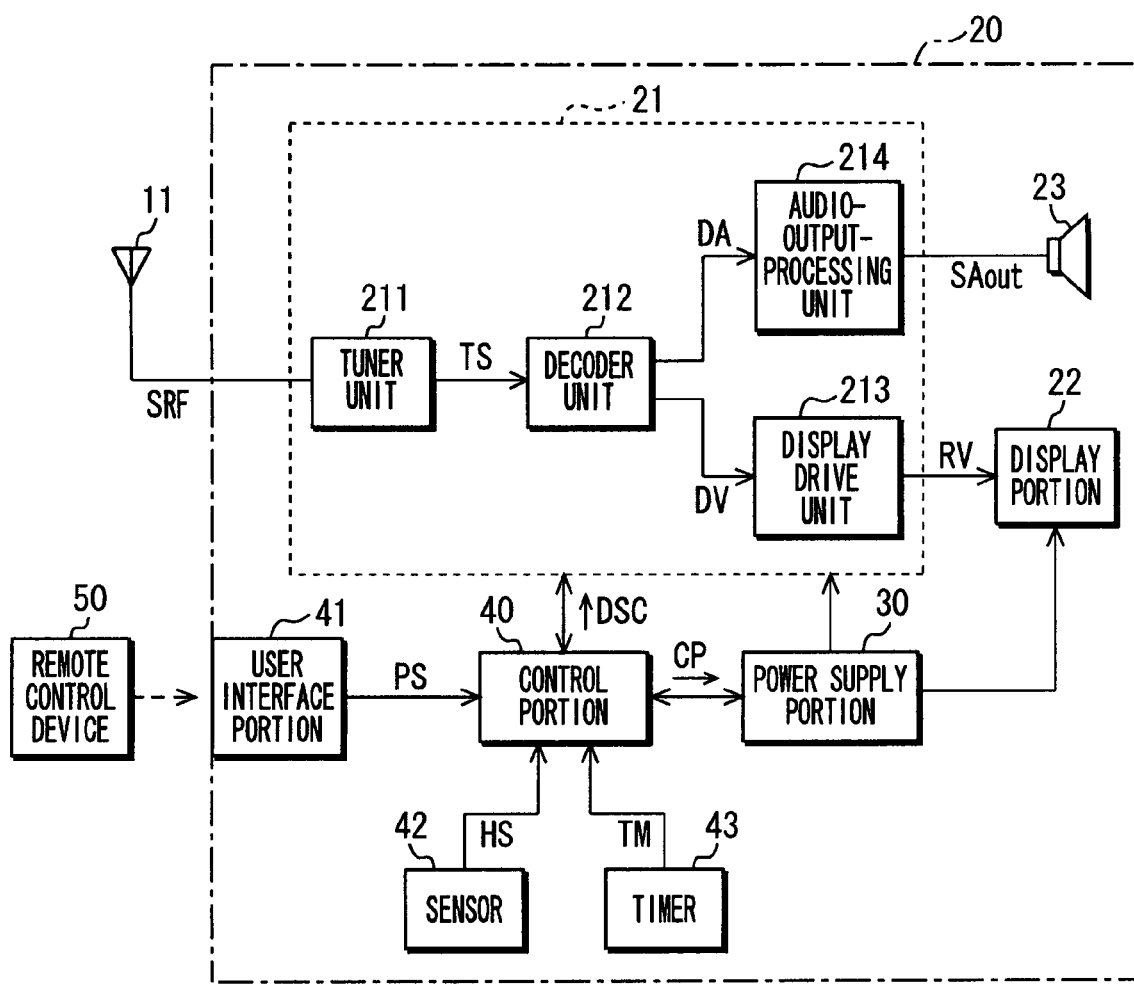
FIG. 1 is a diagram for showing a configuration of an embodiment of an image display device according to the invention.

The following will describe embodiments of the present invention with reference to the attached drawings. FIG. 1 shows a configuration of an image display device 20.

The image display device 20 has a signal-processing portion 21. The signal-processing portion 21 receives a broadcast wave through an antenna 11 to obtain a reception signal SRF. Then, a tuner unit 211 in the signal-processing portion 21 selects a frequency of desired broadcast contents from the obtained reception signal SRF and performs demodulation processing and/or error correction processing and/or de-interleaving processing on the selected signal to produce a transport stream TS. The tuner unit 211 then supplies the transport stream TS to a decoder unit 212 in the signal-processing portion 21.

The decoder unit 212 receives the transport stream TS and separates compressed data of a target program from the transport stream TS. Also, the decoder unit 212 performs any expanding processing or the like on the separated compressed data to obtain an image signal DV and an audio signal DA. The decoder unit 212 supplies thus obtained image signal DV and audio signal DA to a display drive unit 213 and an audio-output-processing unit 214, respectively. Moreover, the decoder unit 212 separates program arrangement information and data of data broadcast contents and supplies them to a later-described control portion 40 in the image display device 20.

The display drive unit 213 generates a display drive signal RV based on the image signal DV received from the decoder unit 212, to drive a display portion 22 of the image display device 20 in accordance with the display drive signal RV. Also, the display drive unit 213, if receiving a on-screen control signal DSC from the later-described control portion 40, generates the display drive signal RV so that a motion image based on the image signal DV and an image of a character or a graphic based on the on-screen control signal DSC are combined to be displayed.

The audio-output-processing unit 214 converts the audio signal DA received from the decoder unit 212 into an analog audio signal and then, amplifies it to a desired signal level, and supplies it to a speaker 23 of the image display device 20 as an audio output signal SAout.

The image display device 20 further has a power supply portion 30 that supplies power to the control portion 40. The power supply portion 30 also supplies power to the signal-processing portion 21 and the display portion 22 based on a control signal CP received from the control portion 40.

The image display device 20 additionally has a user interface portion 41 that generates an operation signal PS in response to a user operation. The user interface portion 41 is connected to the control portion 40. The user interface portion 41 is constituted of an operation key and a remote-control signal reception portion, not shown, that receives a signal transmitted from a remote control device 50. As the operation key, a power supply key that switches the operation mode, a channel key that switches channel, a volume key that adjusts a sound volume, etc. are provided. The user interface portion 41 generates the operation signal PS in accordance with a key operation on any kinds of operation keys and supplies it to the control portion 40. Alternatively, the remote control device 50 also has the operation key like the above operation key. The user interface portion 41 receives a signal from the remote control device 50 and supplies the control portion 40 with the operation signal PS in accordance with a key operation on the operation key of the remote control device 50.

The image display device 20 still further has a sensor 42 or a timer 43 that shows a time, which are connected to the control portion 40. The sensor 42, which is used to detect a change in the ambient environment, generates a sensor signal HS indicative of, for example, brightness of a place where the image display device 20 is installed or a sensor signal HS indicative of proximity of a person. The sensor 42 supplies the generated sensor signal HS to the control portion 40. The timer 43 generates time information TM indicative of the current time and supplies it to the control portion 40.

The control portion 40 contains a microcomputer and a memory and so generates a control signal, not shown, based on the operation signal PS to supply it to the various portions, thereby controlling the image display device 20 so as to switch its operation mode and perform an operation in accordance with the user operation. Further, the control portion 40 stores various kinds of pieces of information which are set by the user, and program arrangement information and data of data broadcast contents received from the signal-processing portion 21. The control portion 40 sets operations etc. of the image display device 20 based on the stored set information. The control portion 40 generates the on-screen control signal DSC based on the program arrangement information and the data of data broadcast contents, thereby enabling display etc. of data broadcast contents.

Moreover, the control portion 40 has as its operation mode the waiting mode, the image-display-waiting mode, and the image display mode, which are switched from each other in accordance with the operation signal PS. The waiting mode refers to as a so-called standby mode, which is an operation mode in which power supply to the signal-processing portion 21 and the display portion 22 stops to de-actuate the signal-processing portion 21 and the display portion 22. The image-display-waiting mode is an operation mode in which power is supplied to the signal-processing portion 21 to actuate it so that software and information may be read into it but power supply to the display portion 22 stops to de-actuate it so that no image may be displayed. The image display mode refers to as a so-called ordinary mode, which is an operation mode in which power is supplied to the signal-processing portion 21 and the display portion 22 to actuate them.

Figure 2:
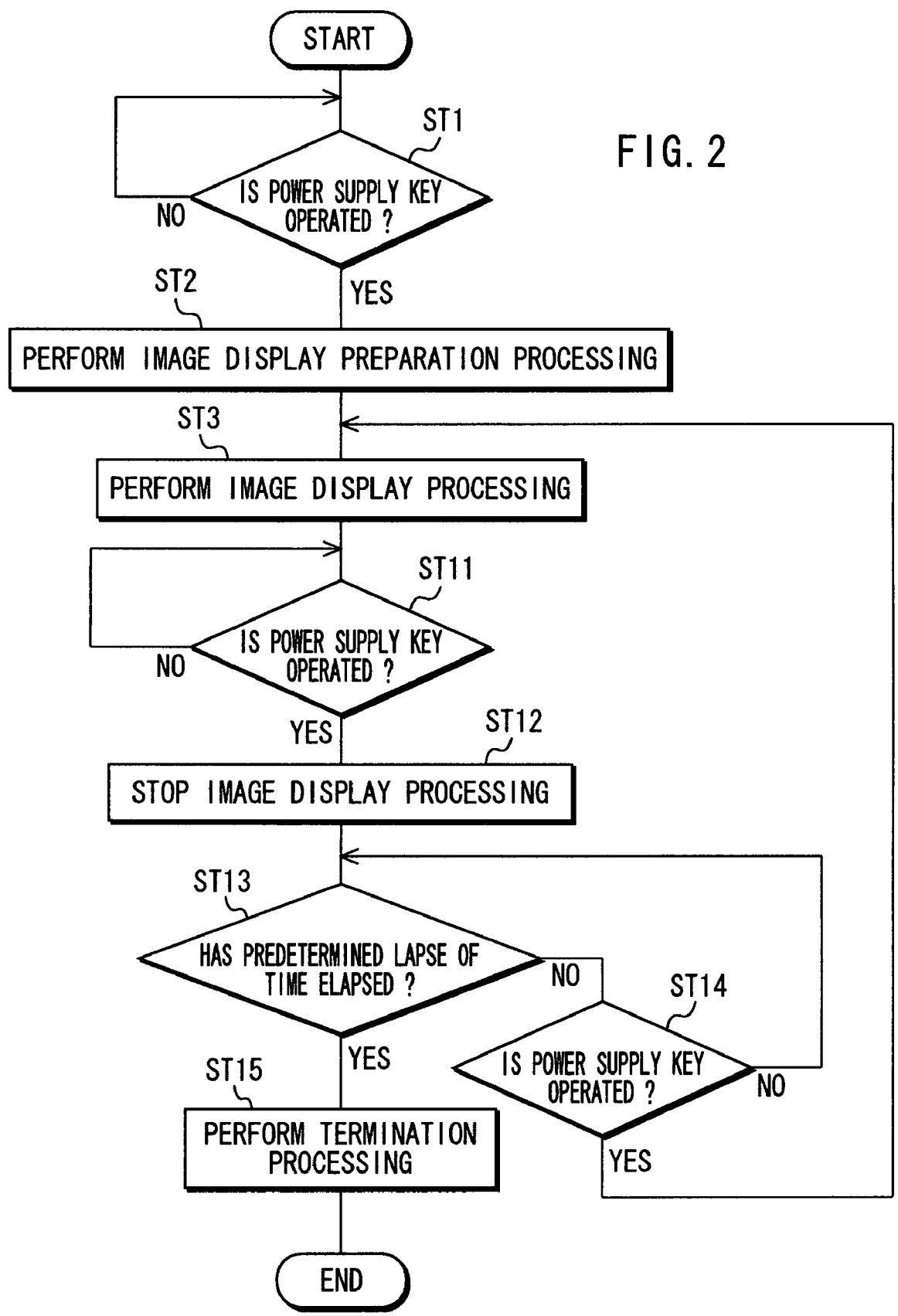
FIG. 2 is a flowchart for showing operations of the image display device.

FIG. 2 is a flowchart for showing operations of the image display device 20. It is to be noted that the following description is based on the assumption that the operation mode is initially set to the waiting mode.

At step ST1, the control portion 40 determines whether the power supply key on the user interface portion 41 or the remote control device 50 is operated based on the operation signal PS. At this step, if having determined that the power supply key is operated, the control portion 40 goes to step ST2 and, if having determined that the power supply key is not operated, the control portion 40 returns to the step ST1.

The control portion 40 performs image display preparation processing at the step ST2 and goes to step ST3. In the image display preparation processing, the control portion 40 controls operations of the power supply portion 30 based on the control signal CP, to supply power to the signal-processing portion 21. The control portion 40 further reads the real-time OS and the various kinds of device drivers as well as the information of the TV program table, thereby causing the signal-processing portion 21 to start its operations. For example, the tuner unit 211 starts selecting a channel viewed when the operation mode is switched to the waiting mode. The decoder unit 212 extracts an image signal and an audio signal of a broadcasted program in the selected channel, and decodes the signals. The display drive unit 213 prepares for outputting the display drive signal RV corresponding to the image signal DV and waits (hereinafter, this waiting state is referred to as "image mute state"). It is to be noted that the image display preparation processing involves audio muting. That is, the audio-output-processing unit 214 prepares for outputting the audio output signal SAout corresponding to the audio signal DA and waits (hereinafter, this waiting state is referred to as "audio mute state").

The control portion 40 performs image display processing at the step ST3 and goes to step ST11. The control portion 40 controls operations of the power supply portion 30 based on the control signal CP, to supply power to the display portion 22. The control portion 40 then releases the display drive unit 213 from its image mute state and supplies the display portion 22 with the display drive signal RV that corresponds to the video signal DV, thereby displaying an image on a screen of the display portion 22. It is to be noted that the image display processing involves audio output. That is, the control portion 40 releases the audio-output-processing unit 214 from its audio mute state and supplies the speaker 23 with the audio output signal SAout that corresponds to the audio signal DA, thereby producing audio sounds from the speaker 23.

At the step ST11, the control portion 40 determines whether or not the power supply key on the user interface portion 41 or the remote control device 50 is operated based on the operation signal PS. At this step, if having determined that the power supply key is operated, the control portion 40 goes to step ST12 and, if having determined that the power supply key is not operated, the control portion 40 returns to the step ST11.

The control portion 40 stops image display processing at the step ST12 and goes to step ST13. The control portion 40 sets the display drive unit 213 to its image mute state. Also, the control portion 40 controls operations of the power supply portion 30 based on the control signal CP to stop supplying power to the display portion 22. It is to be noted that with such the image display stopping processing, audio output stops. That is, the control portion 40 sets the audio-output-processing unit 214 to its audio mute state. By thus performing the image display stopping processing, the control portion 40 switches the operation mode from the image display mode to the image-display-waiting mode.

At the step ST13, the control portion 40 determines whether or not a predetermined lapse of time has elapsed since the image display processing has been performed. That is, the control portion 40 determines whether the predetermined lapse of time has elapsed since the operation mode has been switched from the image display mode to the image-display-waiting mode. It is to be noted that the predetermined lapse of time indicates a lapse of time when the image-display-waiting mode is held (a period of image-display-waiting-mode-holding time). The period of image-display-waiting-mode-holding time may be set beforehand or by the user arbitrarily. If having determined that the predetermined lapse of time has not elapsed, the control portion 40 goes to step ST14. On the other hand, if having determined that the predetermined lapse of time has elapsed, the control portion 40 goes to step ST15.

As in the cases of the step ST1 or the step ST11, at the step ST14, the control portion 40 determines whether or not the power supply key is operated based on the control signal PS. At this step, if having determined that the key is operated, the control portion 40 returns to the step ST3 and, if having determined that the power supply key is not operated, the control portion 40 returns to the step ST13.

Having gone to the step ST15 from the step ST13, the control portion 40 performs termination processing. In the termination processing, the control portion 40 can store any necessary information in a nonvolatile memory etc. Also, the control portion 40 stops operations of the units in the signal-processing portion 21. Thereafter, the control portion 40 controls the operations of the power supply portion 30 based on the control signal CP, to stop power supply to the signal-processing portion 21. By thus performing the termination processing, the control portion 40 switches the operation mode from the image-display-waiting mode to the waiting mode.

Thus, if the power supply key is operated during a period of time when the operation mode is the image display mode, the control portion 40 switches the operation mode to the image-display-waiting mode. In the image-display-waiting mode, the image display preparation processing is already completed, so that if the power supply key is operated in the image-display-waiting mode, the image-display-starting processing is performed to enable an image to be rapidly displayed on the screen of the display portion 22. For example, even if viewing is restarted by operating the power supply key again immediately after former viewing stops by operating the power supply key, the signal-processing portion 21 is already actuated, so that an image can be rapidly displayed without reading the software, the information or the like, thereby enabling a good response to be obtained. This enables a period of waiting time to the image display to be shortened, thereby improving convenience.

Further, the control portion 40 switches the operation mode to the waiting mode when a predetermined lapse of time has elapsed since the image-display-waiting mode has been entered. Thus, the operation mode is automatically switched from the image-display-waiting mode to the waiting mode, so that dissipation power can be suppressed without a labor by the user.

Although the operations shown in FIG. 2 has enabled an image to be rapidly displayed even if the operation mode is switched to the image display mode immediately after the image display mode ends, in any cases other than this also, an image can be displayed rapidly by using a sensor signal HS from the sensor 42.

FIG. 3 is a flowchart for showing other operations of the image display device 20. It is to be noted that this case is also based on the assumption that the operation mode is initially set to the waiting mode.

At step ST21, the control portion 40 determines whether the power supply key on the user interface portion 41 or the remote control device 50 is operated based on the operation signal PS. At this step, if having determined that the power supply key is not operated, the control portion 40 goes to step ST22 and, if having determined that the power supply key is operated, the control portion 40 goes to step ST26.

At the step ST22, the control portion 40 reads the sensor signal HS and goes to step ST23. At the step ST23, the control portion 40 determines whether preparation-starting condition is satisfied based on the sensor signal HS. For example, if an illuminance sensor is used as the sensor 42 and the sensor signal HS indicates brightness of an environment in which the image display device 20 is installed, the control portion 40 determines that the preparation-starting condition is satisfied when the sensor signal HS indicates that the environment has brightness higher than predetermined brightness and goes to step ST24. When the sensor signal HS indicates that the environment does not have brightness higher than predetermined brightness, the control portion 40 returns to the step ST21. Also, if a person detection sensor is used as the sensor 42 and the sensor signal HS indicates proximity of a person, the control portion 40 determines that the preparation-starting condition is satisfied when the sensor signal HS indicates proximity of a person, and goes to step ST24. When the sensor signal HS does not indicate proximity of a person, the control portion 40 returns to the step ST21. Further, if an illuminance sensor and a person detection sensor are used as the sensor 42, the control portion 40 goes to step ST24 when the sensor signal HS indicates proximity of a person in a case where the illuminance sensor detects brightness higher than the predetermined brightness.

At the step ST24, the control portion 40 determines whether the image display preparation processing is completed. If having determined that the image display preparation processing is completed and the image-display-waiting mode is entered, the control portion 40 returns to the step ST21. If having determined that the image display preparation processing is not completed yet, the control portion 40 goes to step ST25.

As in the case of the above-described step ST2, at the step ST25, the control portion 40 performs the image display preparation processing and, upon completion of it, returns to the step ST21.

If having determined at the step ST21 that the power supply key is operated so that the control portion 40 goes to the step ST26, the control portion 40 determines at the step ST26 whether the image display preparation processing is completed. If having determined that the image display preparation processing is completed and the image-display-waiting mode has been entered, the control portion 40 goes to step ST28. If having determined that the image display preparation processing is not performed yet, the control portion 40 goes to step ST27.

As in the case of the above-described step ST2, at the step ST27, the control portion 40 performs the image display preparation processing and, upon completion of it, goes to the step ST28.

As in the case of the above-described step ST3, at the step ST28, the control portion 40 performs the image display processing and goes to step ST31.

The control portion 40 performs processing of steps ST31 though ST35, which are the same as the above-described steps ST11 through ST15, respectively. Since the steps ST31 through ST35 are the same as steps ST11 through ST15, description of steps ST31 through ST35 will be omitted.

By thus utilizing the sensor signal HS, the operation mode can be automatically switched from the waiting mode to the image-display-waiting mode in response to brightness or proximity of a person unless the user operates the power supply key, so that not only in the case of switching the operation mode to the image display mode again by operating the power supply key but also in the case of displaying an image initially by the user's operation of the power supply key, the image can be displayed rapidly by the display portion 22, thereby obtaining a good response.

Moreover, by control of not only switching the operation mode from the waiting mode to the image-display-waiting mode beforehand by utilizing the sensor signal HS, but also of switching the operation mode from the image-display-waiting mode to the waiting mode by utilizing the sensor signal HS, power dissipation in a case where the image-display-waiting mode is employed can be further reduced. For example, there are few cases where the operation mode is switched to the image display mode again when going to bed and there are no cases where the operation mode is switched to the image display mode again when going out. Further, there are many cases where light is turned off in a room when a person is going to bed or going out. Therefore, if an illuminance sensor is used as the sensor 42 and a place where the image display device is installed is dark, the period of image-display-waiting-mode-holding time is set to be shortened. By thus utilizing the sensor 42 to switch the period of image-display-waiting-mode-holding time, power dissipation can be further suppressed by shortening the period of image-display-waiting-mode-holding time if there are fewer cases where the operation mode is switched to the image display mode again.

Further, by using the time information TM in addition to the sensor signal HS, switchover can be controlled from the waiting mode to the image-display-waiting mode or from the image-display-waiting mode to the waiting mode. For example, if the time information TM indicates that it is late at night when a lapse of time when the sensor signal HS indicates that the place is bright is longer than a predetermined lapse of time, the operation mode is switched from the waiting mode to the image-display-waiting mode. In such a manner, in a case where light is turned on temporarily after going to bed, it is possible to prevent the operation mode from being switched from the waiting mode to the image-display-waiting mode unnecessarily.

Moreover, if the user can set the period of image-display-waiting-mode-holding time and whether to employ the image-display-waiting mode, he or she can switch the operation modes at his will. Although the above embodiments has been described with reference to a configuration in the case of receiving a broadcast wave to display an image, in the case of displaying an image based on image data supplied via network, by equipping the signal-processing portion 21 with a communication interface portion, not shown, that connects to the network, a good response can be obtained as in the case of receiving the broadcast wave to display an image.

It should be understood by those skilled in the art that various modifications, combinations, sub-combinations and alternations may occur depending on design requirements and other factors insofar as they are within the scope of the appended claims or the equivalents thereof.

The invention claimed is:

1. An image display device comprising:
a display portion that displays an image;
a signal-processing portion that generates a display drive signal to drive the display portion;
a power supply portion that supplies power to the display portion and the signal-processing portion;
a user interface portion that generates an operation signal in response to a user operation; and
a control portion that controls operations of the display portion, the signal-processing portion, and the power supply portion based on the operation signal,
wherein the image display device operates based on an operation mode, said operation mode including:
a waiting mode in which power supply to the display portion and the signal-processing portion stops to de-actuate the display portion and the signal-processing portion;
an image-display-waiting mode in which power is supplied to the signal-processing portion to actuate the signal-processing portion but power supply to the display portion stops to de-actuate the display portion; and
an image display mode in which power is supplied to the display portion and the signal-processing portion to actuate the display portion and the signal processing portion, and
wherein the control portion switches the operation mode, based on the operation signal, from the waiting mode or the image-display-waiting mode to the image display mode or from the image display mode to the image-display-waiting mode,
and further comprising a proximity sensor that detects a proximity of a person, and
wherein the control portion switches the operation mode from the waiting mode to the image-display-waiting mode based on whether a sensor signal from the proximity sensor indicates the proximity of the person.

2. The image display device according to claim 1, further comprising an illuminance sensor that detects a brightness in an ambient environment, wherein the control portion switches the operation mode from the waiting mode to the image-display-waiting mode when the sensor signal from the proximity sensor indicates the proximity of the person when a sensor signal from the illuminance sensor indicates brightness higher than a predetermined value.

3. The image display device according to claim 1, further comprising a timer that generates time information, wherein the control portion switches the operation mode from the image-display-waiting mode to the waiting mode when it determines based on the time information that a predetermined lapse of time has elapsed since the operation mode has been changed to the image-display-waiting mode.

4. A method of controlling an image display, said method comprising:
providing an operation mode as a waiting mode in which power supply to a display portion that displays an image and a signal-processing portion that generates a display drive signal to drive the display portion stops to de-actuate the display portion and the signal-processing portion, an image-display-waiting mode in which power is supplied to the signal-processing portion to actuate the signal-processing portion but power supply to the display portion stops to de-actuate the display portion, and an image display mode in which power is supplied to the display portion and the signal-processing portion to actuate the display portion and the signal processing portion;
switching the operation mode from the waiting mode or the image-display-waiting mode to the image display mode or from the image display mode to the image-display-waiting mode on the basis of an operation signal in response to a user operation; and
detecting a proximity of a person,
wherein the operation mode is switched from the waiting mode to the image-display-waiting mode based on whether the detecting indicates the proximity of the person.

* * * * *